United States Patent

[11] 3,572,525

[72] Inventors William E. Slagley
 Crown Point;
 Lawrence G. Maloney, Munster, Ind.
[21] Appl. No. 815,740
[22] Filed Apr. 14, 1969
[45] Patented Mar. 30, 1971
[73] Assignee Inland Steel Company
 Chicago, Ill.

[54] BLAST FURNACE CHARGING APPARATUS
 8 Claims, 9 Drawing Figs.
[52] U.S. Cl. ............................................. 214/35,
 266/27
[51] Int. Cl. ............................................. F27b 1/20
[50] Field of Search .................................. 214/35, 35
 (A), 17.4; 266/27

[56] References Cited
 UNITED STATES PATENTS
 3,233,757 2/1966 Long .............................. 214/35
 3,394,826 7/1968 Slagley et al. ................. 214/35

Primary Examiner—Robert G. Sheridan
Attorney—Merriam, Marshall, Shapiro and Klose ABSTRACT: Improvements in apparatus for delivering material to a vessel having an internal gas pressure different than the external gas pressure applied to the vessel, said vessel having an opening through which material can be delivered or supplied from outside to inside the vessel, a closure means which movably plugs and closes the vessel opening to keep the vessel internal gas pressure different than the external pressure and a material-receiving open-mouthed hollow receptacle movably mounted in the vessel so that the mouth can be brought into communication with the vessel opening and receptacle moving means to displace the receptacle and pour material from the receptacle through the mouth and into the vessel, the improvements comprising: means to displace the receptacle into pressure contact with a first sealing ring with the receptacle mouth in communication with the vessel opening, said first sealing ring being supported by the vessel for use in combination with the receptacle for blocking passage of gas between the vessel interior and exterior at least when the vessel opening is open, said sealing ring circumscribing the vessel opening and having a seating surface for contracting the receptacle exterior surface around its mouth.

Further improvements are a sealing ring mounted inside the vessel and below the first sealing ring, said second sealing ring having a larger open area than the first sealing ring, means to rotate the receptacle to position an exterior continuous surface thereof in spaced-apart position relative to the second sealing ring, and means to displace the receptacle continuous surface into contact with the second sealing ring to thereby seal off the vessel interior and permit replacement of the first sealing ring.

INVENTORS
William E. Slagley
Lawrence G. Maloney

BY Merriam, Marshall, Shapiro & Hose
ATTORNEYS

Patented March 30, 1971 3,572,525

INVENTORS
William E. Slagley
Lawrence G. Maloney
BY Merriam, Marshall, Shapiro & Klose
ATTORNEYS

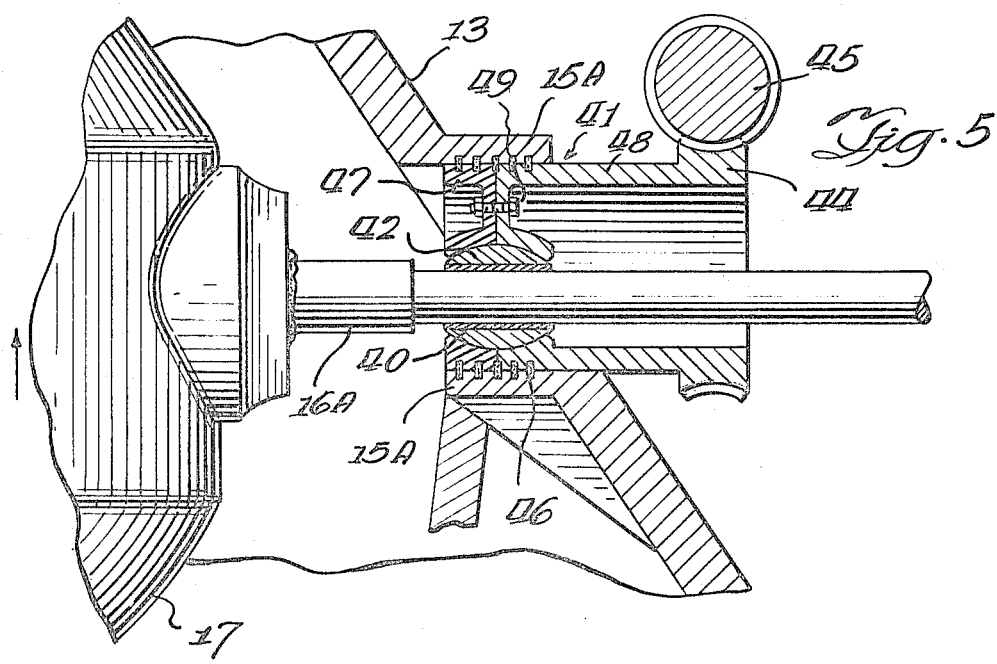
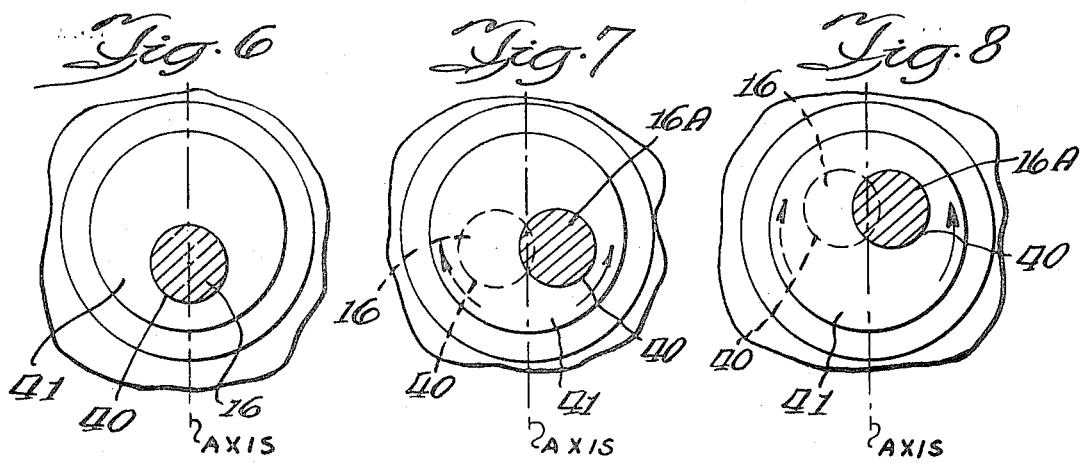
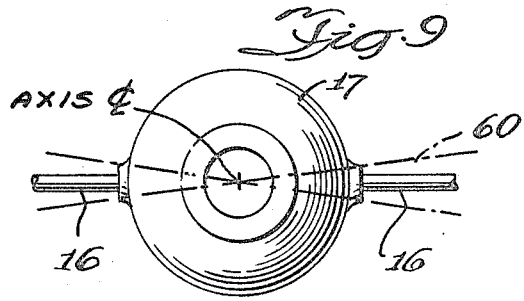

BLAST FURNACE CHARGING APPARATUS

This invention relates to process vessels which operate at an internal pressure different from the external pressure and means for supplying material to the inside of the vessel without significantly altering the vessel internal pressure.

Slagley and Maloney U.S. Pat. No. 3,394,826 discloses an apparatus for delivering material to a vessel having an internal gas pressure different from the external gas pressure applied to the vessel. The vessel has an opening through which material can be delivered or supplied from outside to inside the vessel, a closure means which movably plugs and closes the vessel opening to keep the vessel internal gas pressure different than the external pressure and a material-receiving open-mouthed hollow receptacle movably mounted in the vessel so that the mouth can be brought into communication with the vessel opening and receptacle moving means to displace the receptacle and pour material from the receptacle out its mouth and into the vessel. To maintain a differential pressure in the vessel when the closure plug is open, or to be opened, the receptacle is positioned in upright position and a flexible seal, supported inside the vessel below the vessel opening, expanded into sealing engagement with the vessel around its mouth. With the interior of the vessel sealed off in this way, the closure plug can be removed, material poured into the receptacle, the closure plug replaced, the seal against the receptacle released and the receptacle rotated to dump the material in the vessel. The operation is then repeated to add more material to the vessel while maintaining the internal pressure.

Although the vessel charging apparatus of U.S. Pat. No. 3,394,826 has wide application, it is considered particularly useful in a blast furnace. Since a blast furnace must operate uninterruptedly for an extended period of time, there has been some objection to the use of an expandable seal between the furnace wall and the receptacle to maintain furnace pressure during loading of the receptacle. Possible failure of the expandable seal through deterioration wear or leakage, with loss of iron production while repairs are made, has been advanced as a reason for not adopting the apparatus in spite of its obvious advantages. While such objections are believed based on a lack of understanding of the reliable, tough materials available for use in the expandable seal, a reluctance to make the investment to install the apparatus, if it might not operate defect-free for the full campaign of the furnace, can be appreciated. It is, therefore, a purpose of this invention to provide an alternative, improved sealing means which overcomes these objections and one which permits repairs while the furnace, or other vessel using the invention, is in operation.

According to the present invention, there are provided improvements in apparatus for delivering material to a vessel having an internal gas pressure different than the external gas pressure applied to the vessel, said vessel having an opening for material to be supplied from outside to inside the vessel, a closure means which closes the vessel opening to keep the internal pressure different than the external pressure and a material-receiving open-mouthed hollow receptacle rotatably mounted in the vessel so that the mouth can be brought into communication with the vessel opening and means to rotate the receptacle to pour material out of the receptacle and into the vessel.

The principal improvements comprise, in their simplest form, means to displace the receptacle into pressure contact with a first sealing ring with the receptacle mouth in communication with the vessel opening, the first sealing ring being supported by the vessel for use in combination with the receptacle for blocking passage of gas between the vessel interior and exterior at least when the vessel opening is open, said sealing ring circumscribing the vessel opening and having a seating surface for contacting the receptacle exterior surface around its mouth.

An additional improvement is the provision of a second sealing ring mounted inside the vessel and below the first sealing ring, said second sealing ring having a larger open area than the first sealing ring, means to rotate the receptacle to position an exterior continuous surface thereof in spaced-apart position relative to the second sealing ring, and means to displace the receptacle continuous surface into contact with the second sealing ring to thereby seal off the vessel interior and permit replacement of the first sealing ring.

A particularly useful means to displace the receptacle into pressure contact with the sealing ring comprises a pair of oppositely positioned trunnions on the receptacle, each trunnion extending into bearing means positioned eccentrically in a rotatable circular support, means to rotate the circular support independent of the trunnion and means to rotate the trunnion independent of the circular support.

Also provided is a manifold, above the first sealing ring, comprising a shell supported by the vessel, an internal cylindrical wall supported by the shell in spaced apart arrangement and depending therefrom, and at least one opening in the manifold shell for removing or supplying gas therethrough to thereby control the gas pressure in the vessel space between the closure plug which closes the vessel opening and the first sealing ring when the receptacle is in sealing contact with it.

The invention will now be described further in conjunction with the attached drawings in which:

FIG. 5 is a vertical sectional view showing one of the two trunnions supporting the receptacle and a bearing means mounted on the blast furnace for supporting the trunnion;

FIG. 6 is a schematic view and shows one of the trunnions eccentrically positioned and in its lowest position;

FIG. 7 is a schematic view similar to FIG. 6 but showing the eccentrically mounted trunnions each moving upwardly, clockwise and the other counterclockwise;

Figure 1:
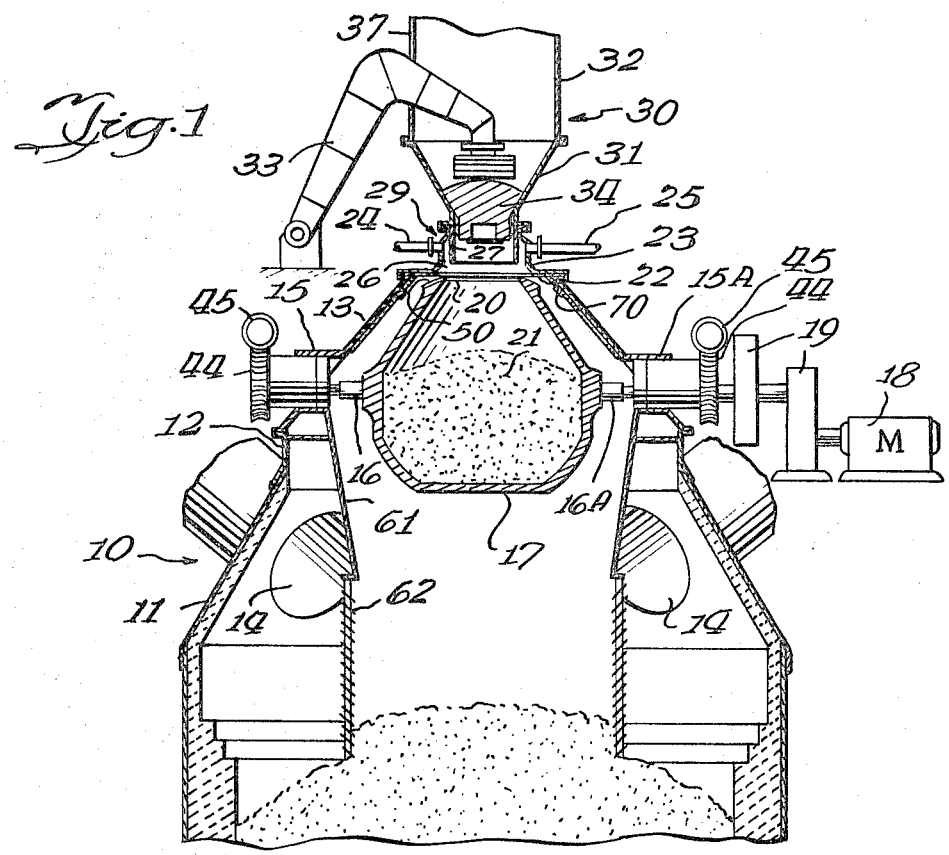
FIG. 1 is a vertical sectional view through the top portion of a blast furnace having the receptacle in lowered upright unsealed position.

FIG. 8 is a schematic view similar to FIG. 7 but showing the position of the trunnions supporting the receptacle when it is in its highest upright position in contact with the first sealing ring and ready for receiving material; and FIG. 9 is a plan view of the receptacle and trunnions and shows the twisting angles through which the trunnions travel when moved in opposite directions during vertical displacement of the receptacle about a fixed or stationary vertical axis.

So far as practical, the same elements and parts which appear in the various FIGS. of the drawings shall be identified by the same numbers.

With reference to FIGS. 1 to 4, there is shown the upper part of blast furnace 10. At the top of the furnace, top cone 11 covers much of the area and at its upper edge there is provided top ring 12 which supports cover section 13. Pipes 14 are for removal of gases produced during the production of iron in the blast furnace. Cover section 13 has bearing supports 15 which support horizontal trunnions or shafts 16 and 16A extending from opposite sides of the material-receiving hollow receptacle 17. Motor 18 drives gear reduction units 19 for rotating receptacle 17 on its trunnions about a horizontal axis. Mouth or opening 20 is provided in receptacle 17 for receiving material therein and discharging the same as it is rotated.

Mounted on the top of cover section 13 is first sealing ring 22 which in turn supports a manifold 29 having a shell 23 and pipes 24 and 25 which can supply gases to, or remove them from, the area 26 between receptacle 17 and closure plug 34 to equalize the pressure therein. Cylindrical sleeve or wall 27, forming part of the manifold 29, is supported by shell 23 and extends below pipes 24 and 25 to avoid having material clog said pipes. Cylindrical sleeve or wall 27 is aligned with mouth 20 to guide material into the receptacle. The wall 27 is spaced from the shell 23 and thereby defines an annular space 28 for transferring large volumes of gases quickly to and from pipes 24 and 25.

Mounted above the manifold 29 is hopper 30 having a lower section 31 and an upper section 32. Section 32 and the upper part of 31 are elliptical in horizontal cross section, making them extra wide to accommodate two skips, side-by-side. Lower section 31 is circular at the bottom. Arm 33 retracts in the space between the two skips. Section 32 of the hopper has a cutaway portion 37 for pivotally mounted arm 33 supporting closure 34 to be moved completely in and out of the hopper 30 for opening and closing the furnace opening.

Figure 2:
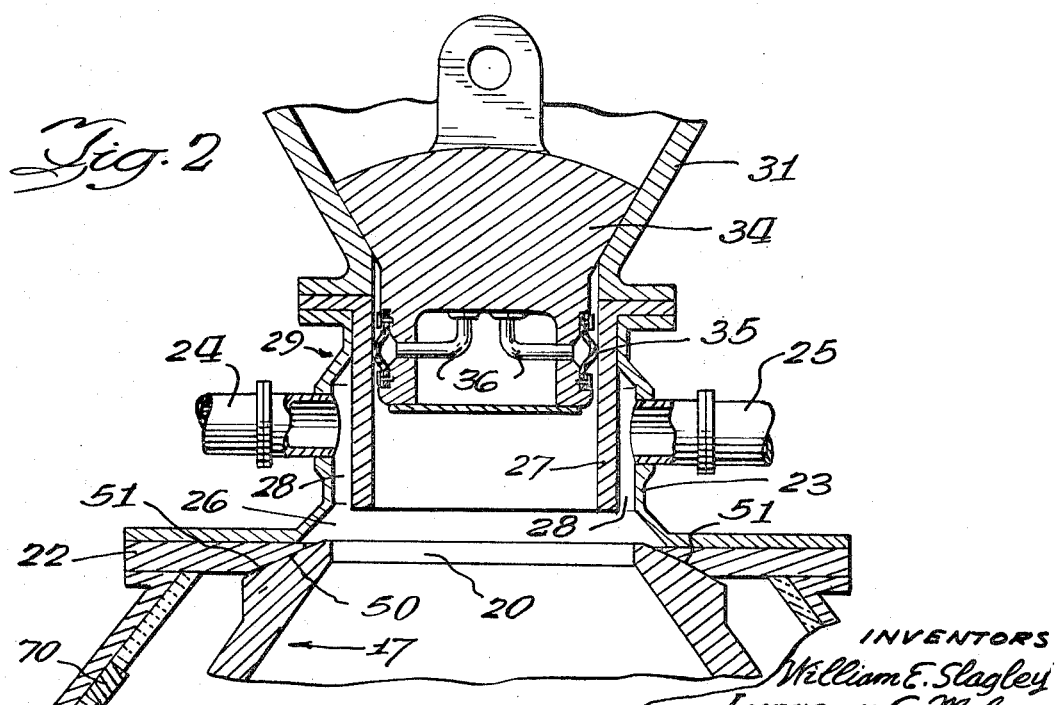
FIG. 2 is an enlarged vertical sectional view showing the upper part of the blast furnace of FIG. 1 with the first sealing ring in contact with the receptacle around its opening or mouth.

As shown in FIG. 2, closure 34 has an expandable seal 35 mounted about its lower periphery. Seal 35 is expanded by fluid fed by pipes 36. It contracts when pressure supplied by pipe 36 is released.

Each of the trunnions or shafts 16 and 16A is supported by means to displace the receptacle 17 into pressure contact with sealing ring 22 with the receptacle mouth in communication with the vessel opening formed by wall 27. In the embodiment shown in FIGS. 1 and 5 of the drawings, each trunnion 16 and 16A is supported in a circular hole or opening 40 in spherical bearing 42 mounted in eccentric circular support 41 rotatably supported by supports 15 and 15A. Circular support 41 is made in two sections 47 and 48 joined together by bolts 49 to permit seating of spherical-type bearing 42. The outer end of section 48 has an integral gear 44 which is actuated by worm gear 45. Gaskets 46 provide a gastight seal when the receptacle is stationary or being vertically displaced or rotated on its trunnions. Spherical-type bearing 42 is located nonradially or offcenter in circular support 41 so that when circular support 41 is rotated an eccentric movement of trunnions 16 and 16A is effected.

Each of the eccentric circular supports 41 supporting trunnions 16 and 16A can be rotated in the same direction to displace the trunnions upwardly. For a lift of about one inch, the eccentricity of the hole 40 in eccentric circular support 41 would be 0.5 inch or slightly more. When both eccentric circular supports 41 are rotated in the same direction, the resulting cam action swings receptacle 17 out slightly to one side and then back in as it moves up. The movement of the receptacle will describe an arc of a circle, the radius of which is equal to the eccentricity of the circular supports.

Figure 3:
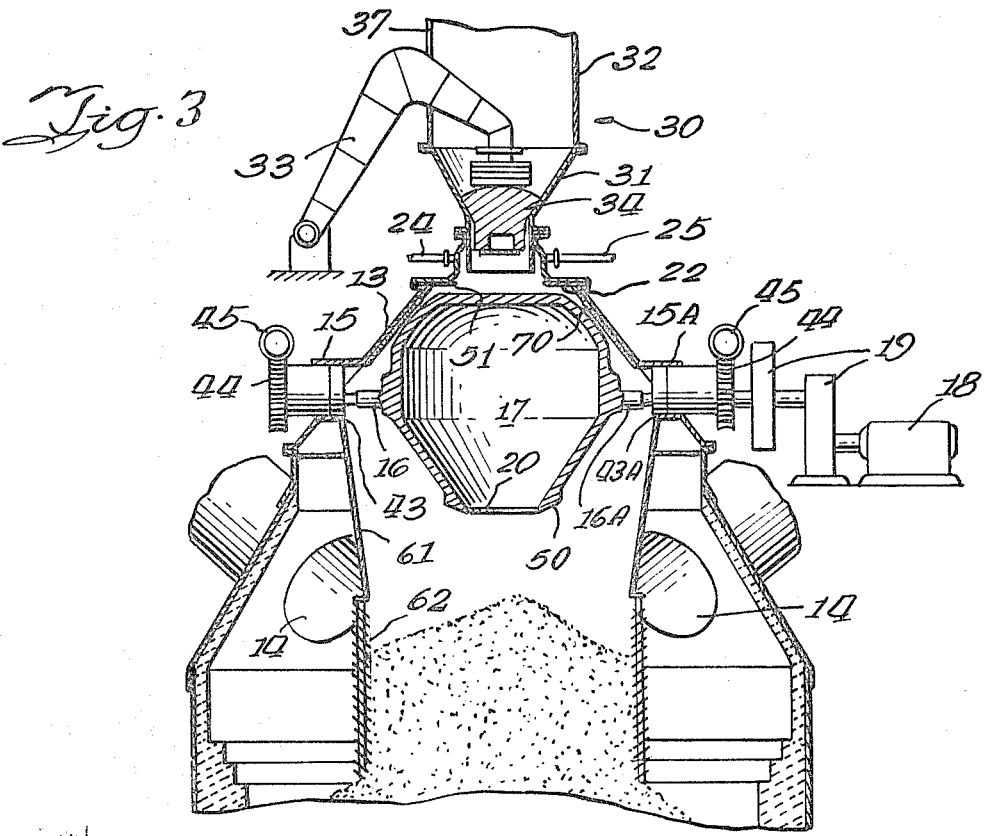
FIG. 3 is a vertical sectional view similar to FIG. 1, but having the receptacle inverted and in lowered position.
Figure 4:
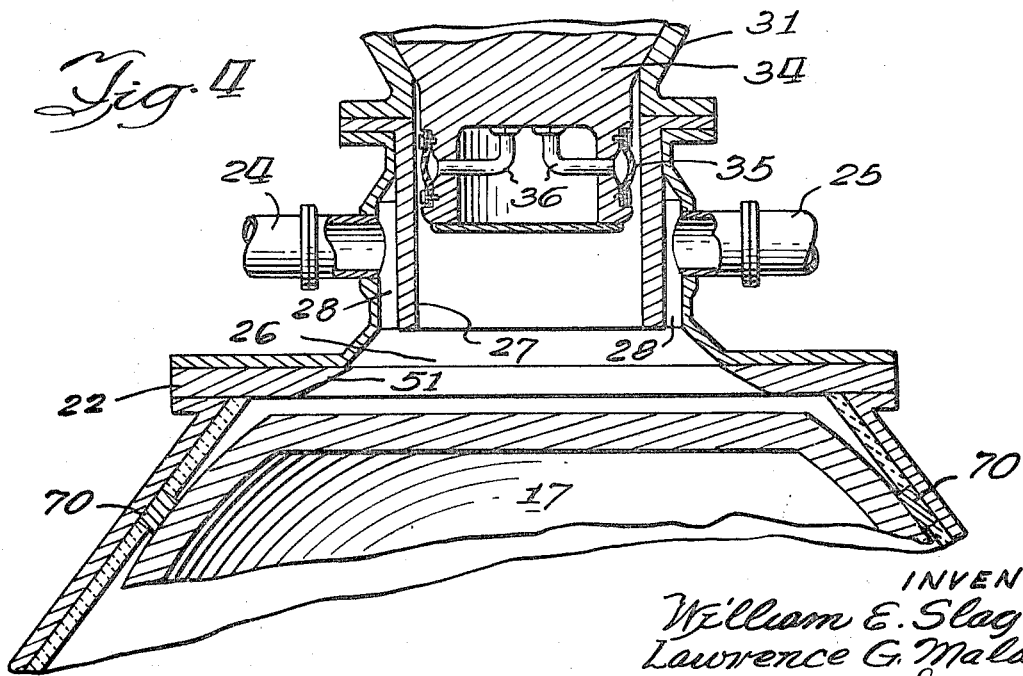
FIG. 4 is an enlarged vertical sectional view showing the upper part of the blast furnace of FIG. 3 with the bottom of the receptacle in engagement with a second sealing ring in the blast furnace wall.

Alternatively and advisably, each circular support 41 is rotated in a direction opposite, or the reverse of, the other one. FIGS. 6 to 9 illustrate the paths through which the trunnions can move in bringing receptacle 17 into engagement with sealing ring 22 using this method. In FIG. 6, circular support 41 is positioned with trunnion 16A in hole 40 in its lowest position. The other trunnion 16 is similarly positioned. When the trunnions are in this position, receptacle 17 is free to rotate about the trunnion axis clockwise or counterclockwise for at least 180° and advisably through a complete circle. The mouth 20, therefore, can move from upright to downward position by a 180° swing such as shown in FIGS. 1 and 3.

FIG. 7 shows the relative position of trunnions 16 and 16A as they are partially displaced upwardly through opposite rotation of each of the circular supports 41 in which the trunnions are eccentrically supported in holes 40.

The trunnions are displaced upwardly until the lips 50 around opening 20 of receptacle 17 are placed in pressure contact with seat 51 of sealing ring 22 (FIG. 2). Contact is made at about 120° of rotation such as when the trunnions 16 and 16A reach the positions shown in FIG. 8. As shown in FIG. 8, the trunnions are not vertically displaced upwardly as far as they could be by continuing the movement of circular supports 41. Further upward movement is limited by sealing ring 22 in order to obtain the needed sealing pressure and engagement. This assures an allowance for wear and expansion. Also, if full upward displacement of the trunnions was permitted, the lips 50 would not contact seat 51 with enough pressure to give an adequate seal. To obtain the desired upward displacement without applying excessive pressure worm gear 45 is controlled by hydraulic means not shown.

FIG. 9 illustrates the position of the trunnions 16 and 16A when the receptacle is in its lowest position corresponding to FIG. 6. Line 60 represents the maximum angle to which the trunnion axis is displaced by the eccentric movement described in connection with FIGS. 6 to 9. During such movement, the vertical axis of receptacle 17 is stationary so that upward displacement of the receptacle follows a very limited twisting or wobbly path. Such movement aids in seating the lips 50 against seat 51 because of the slight twisting action which results as they contact.

FIG. 2 shows the receptacle 17 in sealing engagement with sealing ring 22. Lips 50 around receptacle opening 20 are in pressure contact with seat 51. The seal 35 on closure plug 34 is extended and in contact with wall 27. Since space 26 is at a pressure higher than atmospheric pressure, closure plug 34 is not removed until the pressure in space 26 has been equalized by removing gases through one or both of pipes 24 and 25. After equalization of pressure in space 26 is effected, seal 35 is released and closure plug 34 removed. Material or burden is then fed through hopper 30 into receptacle 17. Closure plug 34 is then repositioned and seal 35 repressurized. The space 26 is now at a lower pressure than in the blast furnace so it is repressurized by means of one or both of pipes 24 and 25 before the receptacle is moved out of sealing engagement with sealing ring 22. The receptacle is then lowered by means of the eccentric bearing means, reversing the sequence described in connection with FIGS. 6 to 9. FIG. 1 shows the receptacle as lowered containing burden 21, with closure plug 34 in place. Skirt 61 and grate 62 suspended therefrom aid in positioning the burden properly in the furnace and distribute the burden radially.

FIG. 3 shows the receptacle in inverted position from which the burden has flowed into the blast furnace. After the receptacle has been emptied, it is rotated on its trunnions 16 and 16A until the mouth 20 is upright. Then by means of the eccentric bearing means, the receptacle is raised as described in connection with FIGS. 6 to 9 to place lips 50 in contact with seat 51. Closure plug 34 is then removed, after equalizing the pressure in space 26, and another load of burden is fed by hopper 30 to the receptacle. Emptying of the receptacle is then repeated as described.

Since it may be desirable to replace or repair sealing ring 22 without shutting down operation of the blast furnace, it is necessary to seal off the space below the seal so that such work can be performed. This can be accomplished by maintaining the receptacle, inverted with the bottom up, as shown in FIG. 3 and then raising the receptacle by means of the eccentric bearing means described in connection with FIGS. 6 to 9 until an exterior bottom portion of the receptacle is placed in sealing contact with a second sealing ring 70 located below the first sealing ring 22. With the blast furnace interior sealed off in this way, the pressure in space 26 can be relieved by pipes 24 and 25, seal 35 then released and closure plug 34 removed. Sealing ring 22 then can be easily and safely removed, repaired or replaced without shutting down the furnace and without interrupting production for more than a few hours.

The embodiment of the invention as illustrated by the drawings utilizes a receptacle which is circular about a vertical axis normal to the trunnion axis. As a result, the first and second sealing rings 22 and 70 are advisably also circular. However, the receptacle need not be circular in cross section. It can be elliptical and even rectangular in cross section. The opening 27, mouth 20, sealing ring 22 and sealing ring 70 are advisably positioned about a common vertical axis when the receptacle is upright, and especially when these elements are circular.

Sealing rings 22 and 70 are advisably made of metal. However, they can also be made, at least in part, of other materials such as hard rubber, asbestos-containing compositions and synthetic polymeric materials, particularly those which are stable at high temperatures. The sealing rings can be rigid or pliable and made of solid material, foamed material or fibrous material.

Although the invention has been described with particular reference to use in a blast furnace, it is obvious that it can be used in other vessels to be charged with material while maintaining an internal differential pressure.

I claim:

1. In an apparatus for delivering material to a vessel having an internal gas pressure different than the external gas pressure applied to the vessel, said vessel having an opening through which material can be delivered or supplied from outside to inside the vessel, a closure means which movably plugs and closes the vessel opening to keep the vessel internal gas pressure different than the external pressure and a material-receiving open-mouthed hollow receptacle movably mounted in the vessel so that the mouth can be brought into communication with the vessel opening and receptacle moving means to displace the receptacle and pour material from the receptacle through the mouth and into the vessel, the improvements comprising:

means to displace the receptacle into pressure contact with a first sealing ring with the receptacle mouth in communication with the vessel opening, said first sealing ring being supported by the vessel for use in combination with the receptacle for blocking passage of gas between the vessel interior and exterior at least when the vessel opening is open, said sealing ring circumscribing the vessel opening and having a seating surface for contacting the receptacle exterior surface around its mouth.

2. Apparatus according to claim 1 having a second sealing ring mounted inside the vessel and below the first sealing ring, said second sealing ring having a larger open area than the first sealing ring, means to rotate the receptacle to position an exterior continuous surface thereof in spaced-apart position relative to the second sealing ring, and means to displace the receptacle continuous surface into contact with the second sealing ring to thereby seal off the vessel interior and permit replacement of the first sealing ring.

3. Apparatus according to claim 2 in which the bottom of the receptacle provides he exterior continuous surface when the mouth is positioned downwardly.

4. Apparatus according to claim 2 in which the vessel opening, receptacle mouth, first sealing ring and second sealing ring are circular and are centrally positioned about a vertical axis when the receptacle is upright.

5. Apparatus according to claim 1 in which the means to displace the receptacle into pressure contact with the sealing ring comprises a pair of oppositely positioned trunnions on the receptacle, each trunnion extending into bearing means positioned eccentrically in a rotatable circular support, means to rotate the circular support independent of the trunnion and means to rotate the trunnion independent of the circular support.

6. Apparatus according to claim 5 in which each circular support can rotate in the same or a different direction with respect to the other circular support.

7. Apparatus according to claim 2 in which the means to displace the receptacle into pressure contact with the first and second sealing rings comprises a pair of oppositely positioned trunnions, each trunnion extending into bearing means positioned eccentrically in a rotatable circular support, means to rotate the circular support independent of the trunnion and means to rotate the trunnion independent of the circular support.

8. Apparatus according to claim 1 having a manifold, above the first sealing ring, comprising a shell supported by the vessel, an internal cylindrical wall supported by the shell in spaced apart arrangement and depending therefrom, and at least one opening in the manifold shell for removing or supplying gas therethrough to thereby control the gas pressure in the vessel space between a closure plug which closes the vessel opening and the first sealing ring when the receptacle is in sealing contact with it.